Aug. 15, 1967     O. E. HALEY     3,336,078
PORTABLE SEAT FOR AUTOMOBILES
Filed Dec. 6, 1965
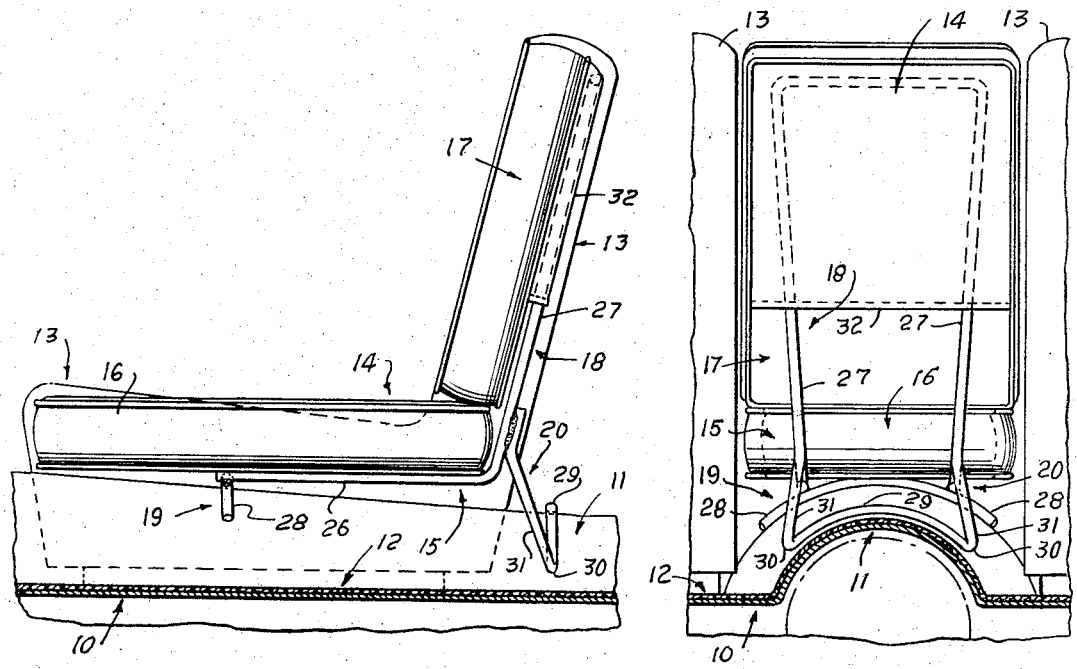
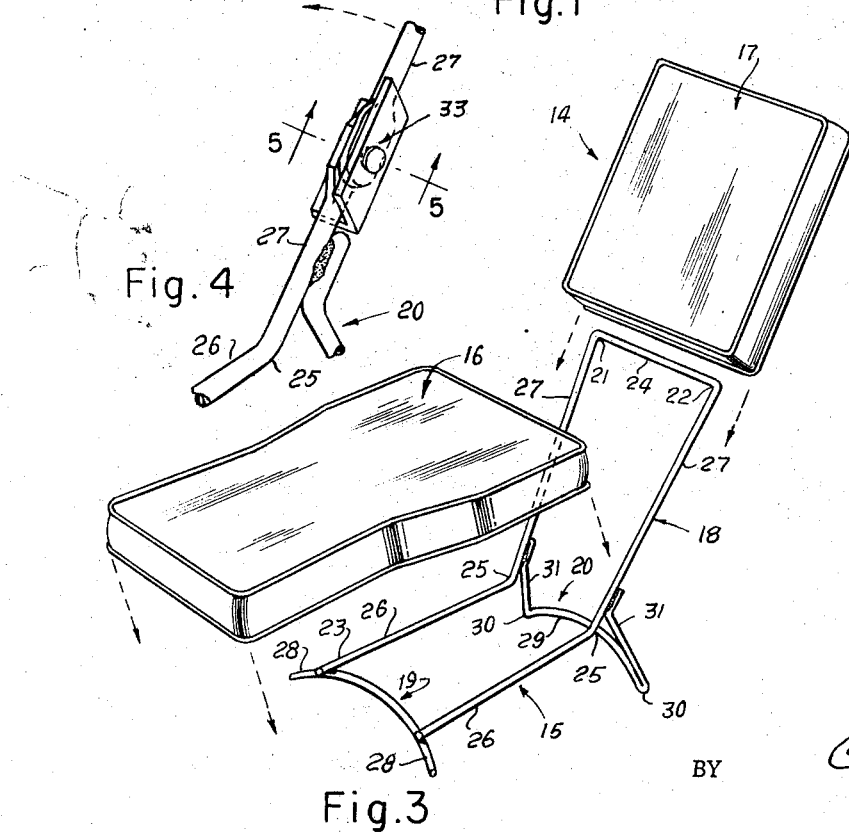
INVENTOR
Odis E. Haley
BY
ATTORNEY United States Patent Office 3,336,078
Patented Aug. 15, 1967

3,336,078
PORTABLE SEAT FOR AUTOMOBILES
Odis E. Haley, 309 Palm Oaks, Dallas, Tex. 75217
Filed Dec. 6, 1965, Ser. No. 511,598
1 Claim. (Cl. 297—232)

This invention relates to a removable seat for automobiles, and it has particular reference to a temporary, removable seat for sports cars and other like automobiles.

*Summary of the invention*

The invention comprises, in summary, a compact removable seat adapted to be installed between the separated front seats of an automobile for the accommodation of a third passenger, or for the comfort of conventional seats, and comprises a specially designed frame for supporting a seating and a back cushion detachably applied thereto, and so shaped as to be conformably supported over the hump or raised portion of the vehicle floor, above the transmission housing, which is common to most conventional automobiles.

The frame has a base portion rigidly attached thereto and formed with forward and rearward bearing members which are curved to conform to the contour of the raised portion of the floor, and transversely thereof, affording a firm support for the seat.

A prime object of the invention therefore is that of providing a compact and economical seat which can be removably positioned in an automobile between its existing front seats, and in the main, comprising a frame of light construction on which cushions can be detachably arranged, and which can be firmly supported on the vehicle floor.

While the foregoing objects are paramount, other and lesser objects will become apparent as the description proceeds, when considered in connection with the appended drawings wherein:

FIGURE 1 is a side elevational view showing a car seat embodying the invention in place in an automobile, showing fragmentarily and partly in section the floor of the automobile and showing the hump extending longitudinally thereof, and showing, in broken lines, a bucket type front seat positioned on one side of the hump.

FIGURE 2 is a rear view taken at right angles to the view shown in FIGURE 1, showing the car seat of the invention as seen from the rear thereof and showing fragmentarily a pair of front seats on opposite sides of the hump having the seat embodying the invention positioned between them.

FIGURE 3 is an exploded perspective view of the invention showing the separable frame and cushion elements whereby the seat may be readily disassembled for convenience in transporting and storing it when not in use.

FIGURE 4 is a fragmentary perspective view on an enlarged scale illustrating a modified form of the invention in which a portion of the frame element corresponding to the back of the car seat is connected to the remainder of the frame element by a pair of hinges on opposite sides thereof, one of which is shown, whereby the frame element may be folded, when the seat is not in use, to make it more compact, and FIGURE 5 is a fragmentary sectional view on an enlarged scale taken on the line 5—5 of FIGURE 4.

Referring to FIGURES 1 and 2 of the drawing, the numeral 10 designates generally the floor of an automobile having a hump indicated generally by the numeral 11, extending longitudinally thereof and forming a tunnel on its under side to accommodate the transmission and drive shaft assembly below it (not shown). The floor 10 has a covering, such as a mat or carpet, indicated generally by the numeral 12.

A pair of front seats, which may be of the type known as bucket seats, indicated generally by the numerals 13, are positioned on opposite sides of the hump 11, and a seat embodying the invention, as hereinafter described, indicated generally by the numeral 14, is positioned between the seats 13. The seat 14, in use as shown, straddles the hump 11 and bridges the distance between the bucket type front seats 13, forming between them a continuous seat subsantially coextensive with the width of the automobile.

As shown best in FIGURE 3, the seat 14 has a unitary frame as hereinafter described, indicated generally by the numeral 15, and a bottom cushion 16 and a back cushion 17. The frame 15 and the cushions 16, 17 are separable elements which are connected only as hereinafter described.

The frame 15 is a unitary structure comprising a first member 18, a second member 19, and a third member 20 as hereinafter described, all of which may be formed of a round stock or tubing. The first member 18, which is relatively longer than the second member 19 and the third member 20, is bent at right angles intermediate its ends, as at 21 and 22, to form a pair of parallel side portions 23 and a connecting end portion 24. The side portions 23 are bent at obtuse angles intermediate their ends, as at 25, to form horizontally extending bottom cushion supports 26 and upwardly and rearwardly inclined back cushion supports 27.

The second member 19, which in use rests upon the hump 11 and frictionally engages the floor 10 and its cover 12, and which is arcuate and conforms to the curvature of the hump 11, is connected intermediate its ends, as by welding, to opposite ends of the first member 18, forwardly of the seat 14, and depends therefrom at its ends to form a pair of front legs 28 whereby the frame 10 is adapted to be supported on a supporting surface upon removing it from the automobile.

The third member 20, which has an intermediate portion 29 which in use rests upon the hump 11 and frictionally engages the floor 10 and its cover 12, and which is arcuate and conforms to the curvature of the hump 11, rearwardly of the second member 19, is bent at actute angles at opposite ends of the intermediate portion 29, as at 30, and is connected at its ends, as by welding, to the upwardly and rearwardly inclined back cushion supports 27 and depends therefrom to form a pair of rear legs 31 whereby the seat 14 is adapted to be supported on a supporting surface upon removing it from the automobile.

The bottom cushion 16 and the back cushion 17 have length and width dimensions and are shaped to conform to the space between them and the opposing surfaces of the adjacent seats 13. In use the bottom cushion 16 is first placed on the bottom cushion supports 26, and thereafter the back cushion 17, which has a pocket 32 in the back side thereof for engagement by the back cushion supports 27, is supported partly on the bottom cushion 16 and partly on the back cushion supports 27.

In the modified form of the invention shown in FIGURES 4 and 5 the back cushion supports 27 are connected to opposite end portions of the first member 18, rearwardly of the third member 20, by a pair of hinges, one of which is shown and indicated generally by the numeral 33, whereby the frame 15 may be folded upon itself when not in use to make it more compact, for convenience in transporting and storing the seat 14.

The invention may be modified within certain limitations, by persons skilled in the art, without departing from the spirit and intent thereof or the scope of the appended claim.

What is claimed is:

In a removable seat for automobiles having spaced apart front seats and having a longitudinally arranged hump in the floor between and forwardly of the said seats, in combination, the improvements comprising: a frame formed of round stock defining a substantially horizontal seat portion and an upwardly and rearwardly inclined back rest portion, the said seat and back rest portions being formed of a single rod bent to a substantial U-shape having paired parallel side members, a first bearing member, curved longitudinally and integrally secured transversely of the ends of said side members connecting the same and curved downwardly at each end whereby to conform to the contour of said hump between the said front seats, a second bearing member formed with an arcuate portion having a radius similar to said first bearing member and having vertically extending leg portions integrally secured to said parallel side members of said frame adjacent to the juncture of said back rest portion to said seat portion, and cushion means detachably arranged on said frame.

References Cited

UNITED STATES PATENTS

| | | | |
|---|---|---|---|
| 1,684,062 | 9/1928 | Leach | 297—378 |
| 1,855,488 | 4/1932 | Rich | 297—248 |
| 2,528,433 | 10/1950 | Hines | 297—378 |
| 2,920,687 | 1/1960 | Hurley | 297—232 |
| 3,048,457 | 8/1962 | Haase | 108—44 |
| 3,050,333 | 8/1962 | Smith et al. | 297—232 |
| 3,140,897 | 7/1964 | Dougherty | 297—378 |
| 3,193,326 | 7/1965 | Smith | 297—378 |
| 3,207,567 | 9/1965 | Brady | 312—235 |

FOREIGN PATENTS

| | | |
|---|---|---|
| 1,201,857 | 7/1959 | France. |

DAVID J. WILLIAMOWSKY, *Primary Examiner.*

FRANCIS K. ZUGEL, *Examiner.*